(12) United States Patent
Kurtycz et al.

(10) Patent No.: US 7,128,373 B2
(45) Date of Patent: Oct. 31, 2006

(54) SEATING SYSTEM AND METHOD OF FORMING SAME

(75) Inventors: Eric R. Kurtycz, Lake Orion, MI (US); Vikas Gupta, East Amherst, NY (US); Charles W. Bowser, Clarkston, MI (US); Laxman P. Katakkar, Maharashtra (IN)

(73) Assignee: Dow Global Technologies, Inc., Midland, MI (US)

( * ) Notice: Subject to any disclaimer, the term of this patent is extended or adjusted under 35 U.S.C. 154(b) by 72 days.

(21) Appl. No.: 10/668,649

(22) Filed: Sep. 23, 2003

(65) Prior Publication Data

US 2005/0040690 A1    Feb. 24, 2005

Related U.S. Application Data

(60) Provisional application No. 60/414,040, filed on Sep. 27, 2002.

(51) Int. Cl.
*A47C 7/00* (2006.01)

(52) U.S. Cl. .......................... 297/452.15; 297/452.14; 297/452.65

(58) Field of Classification Search .......... 297/452.18, 297/452.14, 452.15, 452.55, 452.65
See application file for complete search history.

(56) References Cited

U.S. PATENT DOCUMENTS

| | | | |
|---|---|---|---|
| 3,171,691 | A | 3/1965 | Buehrig |
| 3,638,997 | A | 2/1972 | Shapiro et al. |
| 3,669,496 | A | 6/1972 | Chisolm |
| 3,712,614 | A | 1/1973 | Sherman |
| 4,065,182 | A | 12/1977 | Braniff et al. |
| 4,088,367 | A | 5/1978 | Atkinson et al. |
| 4,123,105 | A * | 10/1978 | Frey et al. ............... 297/451.1 |
| 4,133,579 | A | 1/1979 | Springfield |
| 4,142,757 | A | 3/1979 | Fogle, Jr. et al. |
| 4,246,734 | A | 1/1981 | Fogle, Jr. et al. |
| 4,350,390 | A | 9/1982 | Ogawa |
| 4,478,899 | A | 10/1984 | Mayumi et al. |
| 4,493,505 | A * | 1/1985 | Yamawaki et al. .......... 296/63 |
| 4,530,541 | A | 7/1985 | Resag et al. |
| 4,595,238 | A | 6/1986 | Goldner |
| 4,711,493 | A | 12/1987 | Schrom et al. |
| 4,856,846 | A * | 8/1989 | Lohmeyer .................. 297/285 |
| 4,986,600 | A | 1/1991 | Leblanc et al. |
| 5,029,942 | A * | 7/1991 | Rink .................... 297/452.18 |
| 5,100,204 | A * | 3/1992 | Makihara et al. ...... 297/452.65 |
| 5,133,588 | A | 7/1992 | Hutchinson et al. |
| 5,224,756 | A | 7/1993 | Dukatz et al. |
| 5,253,924 | A | 10/1993 | Glance |
| 5,280,995 | A | 1/1994 | Elton |

(Continued)

FOREIGN PATENT DOCUMENTS

DE         4208150         9/1993

(Continued)

OTHER PUBLICATIONS

Search Report dated Oct. 23, 2002 (1062-010WO).

(Continued)

*Primary Examiner*—Peter M. Cuomo
*Assistant Examiner*—Sarah B. McPartlin
(74) *Attorney, Agent, or Firm*—Dobrusin & Thennisch PC (57) ABSTRACT

The present invention discloses a seating system that includes a seat back (20) with one or more plastic panels (22, 24) that extend across a lateral distance ($D_2$) of the seat back (20). The seat back (20) preferably includes one or more channel forming ribs (50, 54, 58). Optionally the seat back (20) will be anchored to a body of an automotive vehicle with an improved attachment system (100).

25 Claims, 4 Drawing Sheets

U.S. PATENT DOCUMENTS

| | | | |
|---|---|---|---|
| 5,282,667 A | 2/1994 | Elton et al. | |
| 5,298,587 A | 3/1994 | Hu et al. | |
| 5,320,875 A | 6/1994 | Hu et al. | |
| 5,433,786 A | 7/1995 | Hu et al. | |
| 5,487,591 A * | 1/1996 | Knoblock | 297/452.14 |
| 5,494,712 A | 2/1996 | Hu et al. | |
| 5,540,479 A | 7/1996 | Thomas et al. | |
| 5,575,533 A | 11/1996 | Glance | |
| 5,597,205 A | 1/1997 | Glance et al. | |
| 5,601,334 A | 2/1997 | Marks | |
| 5,603,550 A | 2/1997 | Holdampf et al. | |
| 5,658,408 A | 8/1997 | Frantz et al. | |
| 5,700,054 A | 12/1997 | Lang | |
| 5,704,685 A | 1/1998 | Handa et al. | |
| 5,713,634 A | 2/1998 | Koike | |
| 5,722,732 A | 3/1998 | Haldenwanger | |
| 5,743,593 A | 4/1998 | Vogt | |
| 5,782,537 A * | 7/1998 | Leistra et al. | 297/473 |
| 5,837,958 A | 11/1998 | Fornsel | |
| 5,846,377 A | 12/1998 | Frantz et al. | |
| 5,855,706 A | 1/1999 | Grewell | |
| 5,895,096 A * | 4/1999 | Massara | 297/452.34 |
| 5,951,110 A | 9/1999 | Conner et al. | |
| 5,968,431 A | 10/1999 | Ang et al. | |
| 5,984,419 A | 11/1999 | Partington et al. | |
| 5,988,757 A * | 11/1999 | Vishey et al. | 297/452.31 |
| 6,027,171 A | 2/2000 | Partington et al. | |
| 6,079,781 A | 6/2000 | Tilley | |
| 6,168,239 B1 | 1/2001 | Conner et al. | |
| 6,250,680 B1 | 6/2001 | Moker | |
| 6,260,924 B1 * | 7/2001 | Jones et al. | 297/452.18 |
| 6,328,386 B1 | 12/2001 | Good | |
| 6,491,346 B1 * | 12/2002 | Gupta et al. | 297/452.65 |
| 6,536,844 B1 | 3/2003 | Huse | |
| 6,557,929 B1 | 5/2003 | Fox et al. | |
| 6,679,558 B1 * | 1/2004 | Adams et al. | 297/452.65 |
| 6,688,700 B1 | 2/2004 | Gupta et al. | |
| 6,733,064 B1 * | 5/2004 | Fox et al. | 296/68.1 |
| 2002/0060492 A1 * | 5/2002 | Nagamitsu et al. | 297/452.18 |
| 2002/0144808 A1 | 10/2002 | Jones | |
| 2002/0148427 A1 | 10/2002 | Jones et al. | |
| 2003/0062759 A1 | 4/2003 | Gupta et al. | |
| 2003/0197296 A1 * | 10/2003 | Krassilnikov | 264/40.6 |
| 2004/0155511 A1 * | 8/2004 | Garnweidner et al. | 297/452.18 |

FOREIGN PATENT DOCUMENTS

| | | |
|---|---|---|
| DE | 197 28 052 A1 | 1/1999 |
| FR | 2420424 | 10/1979 |
| WO | WO 99/52703 | 10/1999 |
| WO | WO 01/92051 | 12/2001 |
| WO | WO 03/016091 A1 | 2/2003 |

OTHER PUBLICATIONS

Search Report dated Oct. 29, 2001 (1062-002WO).
Search Report dated Feb. 12, 2004 (1062-018WO).
U.S. Appl. No. 09/466,321, filed Dec. 17, 1999.
U.S. Appl. No. 60/312,874, filed Aug. 15, 2001.
U.S. Appl. No. 60/335,430, filed Oct. 31, 2001.
U.S. Appl. No. to be Assigned, filed Feb. 11, 2004.
U.S. Appl. No. 10/739,875, filed Dec. 18, 2003.
"The Scene", GE Plastics, Issue 9, Summer 2000.
Nuss, Rudolf; and Litjens, Frank, "Design and Development of a New Rear Seat Back Made From Glass Mat Thermoplastic Materials," GE Plastics, p. 1-2.
"Injection Molding Gas Assist Technology Guide", GE Plastics, pp. 1-40.

* cited by examiner

SEATING SYSTEM AND METHOD OF FORMING SAME

CLAIM OF BENEFIT OF FILING DATE

The present application claims the benefit of the filing date of U.S. Provisional Application Ser. No. 60/414,040, filed Sep. 27, 2002, hereby incorporated by reference.

TECHNICAL FIELD

The present invention relates to an improved seating system, and more particularly to an improved system for automotive vehicle seating. The present invention also relates to improved automotive vehicle interior systems.

BACKGROUND

There is an ever-growing need for improved seating systems in automotive vehicles. The surge in popularity of hatchbacks, sport utility vehicles and minivans, has posed unique design challenges, in view of the need for seating to be adjustable and in many instances to restrain cargo carried toward the rear of the vehicle. In light of the increased consumer usage of these vehicles for stowage and transport of cargo along with passengers (particularly passengers in rear seats), manufacturers have turned their attention to improving the ability of the seating systems to withstand large loads.

One approach has been to develop improved systems for transmitting loads to the seat tracks of vehicle seating assemblies. A growing number of applications, however, employ attachment of seating components directly to the vehicle body in white for load distribution to the body in white. For the improved seat track technology to be viable in the latter applications, it would require substantial modification, which is believed would unduly complicate the manufacturing procedures, require the development of expensive new processing techniques, or add substantial weight to the vehicles. Accordingly, there is a need for an improved, readily manufactured seating system that is capable of meeting vehicle manufacturer design criteria and government standards for vehicles, and which can be efficiently and conveniently adapted for use in a variety of applications including those involving seat track load distribution, body in white load distribution or both.

In addition to having load bearing characteristics, it may be desirable for seating systems to include one or more additional functional features, ordinarily packaged elsewhere (e.g., in other locations of a vehicle). Examples of such features include ducts, vents, motors, electronic devices, entertainment devices, communications devices, other comfort, convenience or utilitarian features and the like. Accommodation of these features in conventional seats often poses difficulties given the limited packaging space available. Thus, there is also a need for a seating system that can integrate one or more comfort, convenience or other utilitarian features.

Moreover, it may be desirable to maintain lower costs and lower weight for the seating system. Thus, certain embodiments of the present invention may seek to use relatively small amounts of material for the seating system shile still maintaining its structural integrity.

Examples of advantageous improved systems for seating are disclosed in commonly-owned and co-pending U.S. application Ser. No. 09/766,792 (filed Jan. 22, 2001), Ser. No. 60/312,874(filed Aug. 15, 2001), Ser. No. 60/329,187; filed Oct. 12, 2001, U.S. Ser. No. 09/766,792 (filed Jan. 22, 2001) and U.S. Ser. No. 10/216,970 (filed Aug. 12, 2002) the teachings of which are hereby expressly incorporated by reference herein for all purposes.

SUMMARY OF THE INVENTION

The needs in the art are met by the automotive vehicle seating system of the present invention, which includes a plastic seat back having at least one panel substantially defined by an outer periphery and having a main wall that substantially continuously spans between the entirety of the periphery. Preferably, the panel includes only one such main wall and is substantially devoid of any wall that substantially continuously opposes its main wall. The at least one panel preferably includes one or more reinforcement structures (e.g., integrated reinforcement structures) for providing strength to the seat back when assembled. According to one highly preferred embodiment, the panel includes planar ribs, channel forming ribs or a combination thereof extending across the wall of the panel. Optionally, the seating system includes an attachment system that includes one or more attachment locations integrally formed in the panel of the seat and a fastener assembly (e.g., comprised of bracket, rods or the like) for fastening to the panel at the attachment locations.

Although other methods of formation are contemplated, the panel of the seat back is preferably formed in an injection molding process. Moreover, in one highly preferred embodiment, a gas assist injection molding process is employed to locate channel forming ribs on the panel. Preferably, the ribs extend substantially between and substantially interconnect the attachment locations.

Advantageously, the seating system displays no fragmentation upon rapid acceleration up to about 20 to about 30 g, with at least a 36 kg mass placed behind the seat back. The system is easy to manufacture and will not add substantial weight to the vehicle as compared with other commercial seating systems. Moreover, since the seat back of the system may be formed of a panel with a singular main wall, cost of forming the seat back may be reduced.

DETAILED DESCRIPTION OF THE PREFERRED EMBODIMENT

According to one aspect of the present invention, a seat back system having ribs is provided, and particularly, a seat back having one or more channel forming ribs that extend along a main wall of the seat back panel. Advantageously, the ribs provide substantial strength to the main wall of the seat back and, as a result, many design advantages may be derived from the employment of such ribs. As an example, it may be possible to form an entire seat back panel as a singular molded piece without other significant strength components added to the seat back panel. As an example, it may be possible to form a seat back panel with only one main wall (e.g., without an opposing main wall). It may also be possible to form thinner main walls for the seat back panel.

According to another aspect of the present invention, there is provided an improved system of attaching or anchoring a seat back to a vehicle. The system can provide for ease of assembly, ease of use or both. Moreover, in certain embodiments, the attachment system minimizes components required to anchor the seat back and the attachment system may also minimize costs. In one highly preferred embodiment, at least a portion of the attachment system is integrally formed with the seat back itself.

Figure 1:
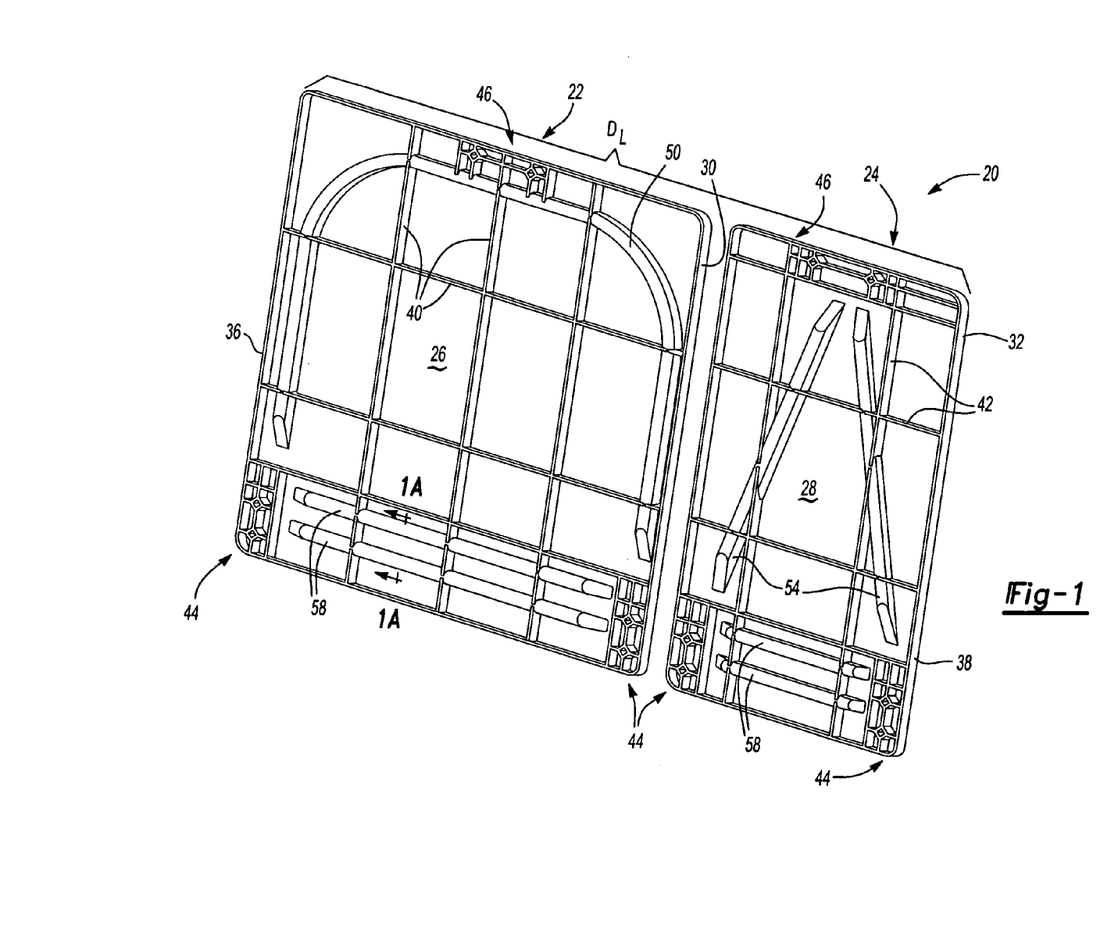
FIG. 1 is a perspective view of a seatback for a seating system.

Referring to FIG. 1, there is illustrated an improved seat back system 20. The seat back 20 typically includes one or more panels 22, 24 that span the lateral distance ($D_L$) of the seat back system 20. Preferably, each of the one or more panels 22, 24 include a main wall 26, 28 and, preferably, only one main wall 26, 28 as will be further described below.

Each of the one or more panels of the seat back will include, one or more reinforcement structures (e.g., ribs or other integrated reinforcement structures) attached to and extending at least partially away from the wall. Preferably, the main wall of each panel spans substantially continuously between an entire periphery of the panel with the reinforcement structures extending substantially along the wall. It is also preferable for the main wall and the reinforcement structures to be integrally formed of one material by employing an injection molding or other molding process. However, it is contemplated that the reinforcement structures might be formed of material different than the wall, for instance, which may be insert molded or otherwise and attached to the wall with fasteners, adhesive or other attachments.

The panels of the seat back may be formed of any suitable material, including but not limited to metal, plastic (including reinforced or unreinforced plastic), other composite material or otherwise. Preferably, at least one of the panels is plastic. More preferably, all of the panels are plastic.

The employment of microcellular foam plastics is also contemplated within the scope of the present invention. In accordance therewith, a gas/polymer solution is formed, and the solution is rendered thermodynamically unstable in order to nucleate microvoids. The growth of nuclei is then controlled as desired.

It is possible to make seat back panels using art-disclosed techniques for the fabrication of the material selected. Thus, for example, the panels may be formed, molded, machined or otherwise configured to the desired shape. Where the panels are plastic, it is possible to use any suitable plastic fabrication technique including, without limitation, injection molding (including but not limited to external or internal gas injection molding), blow molding, compression molding, rotational molding, thermoforming, extruding, vacuum forming, foaming-in-place, or otherwise. Accordingly, as can be appreciated, in one embodiment, hybrid seat assemblies can be fabricated, thereby taking advantage of the benefits of different respective materials and different respective fabrication techniques, and also advantageously permitting for the ability to design additional features.

As an added advantage, the different forming techniques and particulary injection molding can allow the panels to be designed more easily to include contoured surfaces such that the seat back can be better fit within the vehicle and increase passenger and cargo space within a vehicle. Additionally, the techniques permit for the ability to add shoulder wings for accommodating wheel wells, or central disposed wings to meet above an arm rest or a center pass through door.

It will be appreciated that the seat back may also be molded to accommodate or include any of a variety of functional features as well, such as guide tracks for receiving additional components, cup holders, work or rest surfaces, or the like.

Reinforcement structures may also be formed quite easily using the concepts of the present invention. Turning now in further detail to this aspect, assuming an x-y-z orthogonal coordinate system, the section and wall profiles may vary generally in at least one axis, e.g., in the z direction, to define individual reinforcement structures, particularly illustrated as an integrated reinforcement structure. The section or wall profile might also vary in either or both of the x direction (i.e. cross car) or y direction (i.e. generally vertical in the seat's upright position) for an individual integrated reinforcement structure. In general the individual integrated reinforcement structures are made up of components that are vertically oriented (i.e. in the y-direction), horizontally oriented (i.e. in the x-direction), of a predetermined geometry, or a combination of some or all of these.

As used herein, the phrase "integrated reinforcement structure" shall refer to a location that is enlarged or reduced in wall thickness, section thickness, or otherwise configured to effectively create a beamed structural section for creating a locally modified bending moment or otherwise imparting additional rigidity, toughness or impact resistance to a seat back assembly.

Further, the present invention contemplates that other reinforcing structures, fasteners, hooks, handles, or other utilitarian or ornamental features are insert molded in the plastic portion using art-disclosed insert molding techniques. For instance, a bright (e.g., chromed) bezel, a soft touch surface (e.g., textile or leather, padded or not) or other trim might be insert molded to be exposed on a surface of the portion. An identification badge (e.g., a logo or nameplate) might be insert molded as well. Tie downs, baggage hooks or the like might be molded to be exposed to view. Also, it is possible to include a reinforcement member (e.g., made of steel, magnesium, composite, foam, carbon fibre or otherwise) insert molded or otherwise fabricated or placed within the portion and not exposed to view.

The present invention contemplates the use of the integrated reinforcement structures for imparting additional rigidity, toughness or impact resistance to a seat back assembly, or otherwise locally modifying the bending moment of a structure.

Examples of structures or patterns for reinforcement structures may include, without limitation, the "C" shape, "D" shape, "H" shape, "I" shape, "J" shape, "L" shape, "M" shape, "N" shape, "O" shape, "S" shape, "T" shape, "U" shape, "V" shape, "W" shape, "X" shape, "Y" shape, "Z" shape, curves (e.g. sinusoidal curves), zig zags, "+" shape, or the like.

In one preferred embodiment, the reinforcement structures of the panels are integrally formed plastic ribs. The ribs of the panels for the seat back may be configured as desired for reinforcing the main wall of the seat back and such configuration may depend upon the design (e.g., shape, size, strength requirements or the like) of the seat back for any particular vehicle. For example, the ribs may be substantially planar or contoured and may be large or small and short or long depending upon the design of the seat back. Moreover, there may be as many or as few ribs as required or desired.

In one highly preferred embodiment, the ribs are provided as channel forming structures that are attached to the main wall of the seat back in a manner that allows the ribs to form tubular structures in conjunction with the wall. In this embodiment, the channel forming ribs may be shaped in a variety of cross-sectional configurations such as arched, arced, angled, geometric, planar, contoured or the like. In turn, the channel forming ribs may form tubular structure in a variety of cross sectional configurations such as square, rectangular, arched, triangular or the like.

The channel forming ribs may extend along the wall of the seat back in a variety of directions. The ribs may extend laterally, horizontally, vertically or at nearly any desired angle or a combination thereof. The ribs may extend fully or partially across the wall of the seatback and may extend straight across or may be arced, angled or otherwise contoured as they extend across the wall of the seat back. It is also contemplated that one or more channel forming ribs may extend substantially continuously or intermittently adjacent or about the periphery of the seat back. In preferred embodiments, the channel forming ribs extend between attachment locations upon the wall of the seat back wherein the locations are adjacent to attachments that attach the seat back to other portions of the vehicle such as the body (e.g., the body in white) of the vehicle.

It is contemplated that seat backs having channel forming rib structures may be used for a wide variety of different type seat backs. For example and without limitation, the seat backs may be used for sedan-type vehicles for sedan rear seating or for free-standing seat back such as in mini-vans, SUVs or the like It is further contemplated that additional reinforcements may be includes in seat backs having channel forming ribs. As one example, a free-standing seat back might include a metal or other type frame extending about a peripheray of the seat back.

Referring again to FIG. 1, there is illustrated one exemplary seat back system 20 having a first panel 22 and a second panel 24. The first panel 22 is laterally adjacent to the second panel 24 for spanning the lateral distance $D_L$ of the seat back system 20. Each of the panels 22, 24 is respectively shown to include a main wall 26, 28 that substantially continuously spans between the entirety of a periphery 30, 32 of each of the panels 22, 24. Preferably, each of the panels 22, 24 respectively includes only one such main wall 26, 28 and is substantially devoid of any wall that substantially continuously opposes its main wall 26, 28.

Each of the panels 22, 24 includes a plurality of ribs for reinforcing the main walls 26, 28 and each of the panels 22, 24 includes both planar ribs and channel forming ribs although not necessarily required. As shown, each of the panels 22, 24 employs a peripheral planar rib 36, 38 that extends substantially continuously about the peripheries 30, 32 of the respective panels 22, 24. Each of the panels 22 also includes a plurality of spaced apart primary planar ribs 40, 42 that extend across the main walls 26, 28 in a criss-cross pattern (preferably vertical and horizontal ribs) and interconnect with the peripheral planar ribs 36, 38. In the preferred embodiment, each of the panels 22, 24 also includes additional secondary planar ribs for forming reinforced attachment locations 44, 46 as will be discussed further below. As used herein, the terms "primary" and "secondary" are used only to distinguish ribs that substantially extend from one side of a main wall to another possibly opposing side of the main wall (i.e., primary ribs) as opposed to ribs that extend only over a relatively smaller portion (e.g. an attachment location) of the main wall (i.e., secondary ribs).

When employed with vertically oriented integrated ribs, the horizontally oriented integrated ribs preferably are staggered between the vertically oriented integrated ribs or otherwise located to help reduce the likelihood they will serve as a hinge point. Spacing between the ribs (e.g., between substantially parallel ribs) will typically vary from about 5 mm to about 100 mm and more preferably about 20 mm to about 50 mm.

The channel forming ribs of each of the panels 22, 24 are preferably disposed upon the walls 26, 28 in a configuration that provides substantial reinforcement to the wall 26, 28.

The channel forming ribs preferably extend substantially between and/or substantially interconnect the attachement locations 44, 46 of the panels 22, 24. As an example, the first panel 22 includes a channel forming rib 50 that extends in an arc shape across the wall 26 substantially adjacent the periphery 30 of the panel 22 from a first lower corner attachment location 44 to an upper central attachment location 46 to a second lower corner attachment location 44. As another example, the second panel 24 includes a pair of channel forming ribs 54 wherein one of the ribs 54 extends linearly from a first lower corner attachment location 44 to an upper central attachment location 46 and another of the ribs 54 extends linearly from a second lower corner attachment location 44 to an upper central attachment location 46.

Figure 1A:
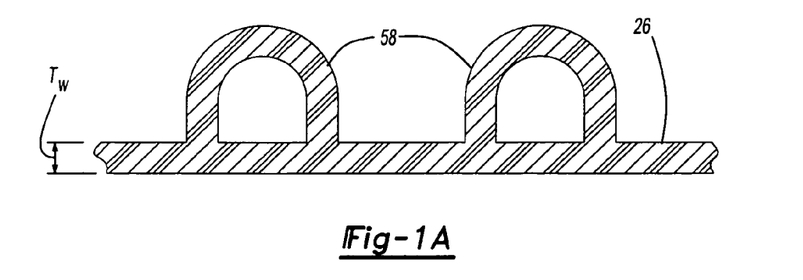
FIG. 1A is a sectional view of the seatback of FIG. 1 taken along line 1A—1A.

Each of the panels 22, 24 also includes a pair of channel forming ribs 58 extending linearly and generally parallel to each other between the first and second lower corner attachment locations 44. In the embodiment shown, and particularly with reference to FIG. 1A, the channel forming ribs 58 are arc shaped in cross-section although, as previously suggested, a variety of cross-sectional shapes may be employed.

It is contemplated that formation of the channel forming ribs may be accomplished using any of the variety of forming techniques disclosed herein or other forming techniques. According to one preferred embodiment, the seat back is formed by injection molding and the ribs are formed during injection molding using, in particular, gas assist injection molding. During such a process, a molten plastic polymer resin (preferably formed of one of the materials discussed herein) is injected into a mold of an injection molding machine. Then, pressurized gas, preferably, an inert gas, such as nitrogen or the like, is introdroduced into the mold such that portions of resin are urged into channels within the mold. Thereafter, gas pressure is maintained as the resin cools and hardens thereby forming the seat back with the channel forming ribs as wells as the other ribs, walls or the like of the seat back.

Advantageously, the channel forming ribs alone or in addition to other ribs, which may be integrally formed of resin with the seat back provide enough strength such that additional reinforcements formed of materials other than the resin are unneeded. In other instances, the need for structural reinforcements of materials separate from the resin forming the seat back is minimized.

Dimensions of the various portions of the panels of the present invention may vary significantly. Advantageously, however, relatively thin wall thickness may be effectively used. As used herein, and referring to FIG. 1A, the phrase "wall stock thickness" or "wall thickness" shall refer to the dimension ($T_W$) between a first surface and a second surface of a wall, such as the main walls of the panels, the wall or walls of the planar and channel forming ribs 58 or the like.

According to preferred embodiments of the present invention, wall thicknesses may vary between about 1 mm and 4 mm, and more preferably between about 2.0 mm and 3.0 mm.

The design and location of each reinforcement structure or pattern fabricated in the seat back may be optimized for each individual application, taking into account some or all of the following criteria. For each application, the skilled artisan will appreciate that the specific integrated reinforcement structure employed is configured to help minimize the bending or hinge effect caused by loads resulting from rapid deceleration or acceleration of a vehicle in the presence of a passenger or cargo behind a seat (e.g., that which experienced by a top mounted center shoulder belt, top mounted child seat anchors, and luggage intrusion). For instance, in one preferred embodiment, the integrated reinforcement structure and pattern selected generally is one that will position a portion of the integrated reinforcement structure having a higher bending moment in a position generally perpendicular to the torsional bending diagonal plane.

Figure 2:
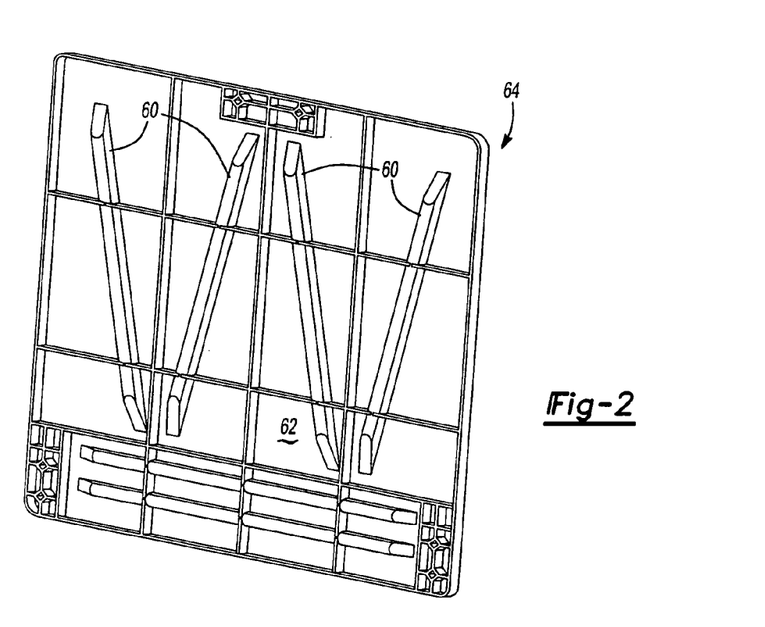
FIG. 2 is a perspective view of an alternative seatback for a seating system.
Figure 3:
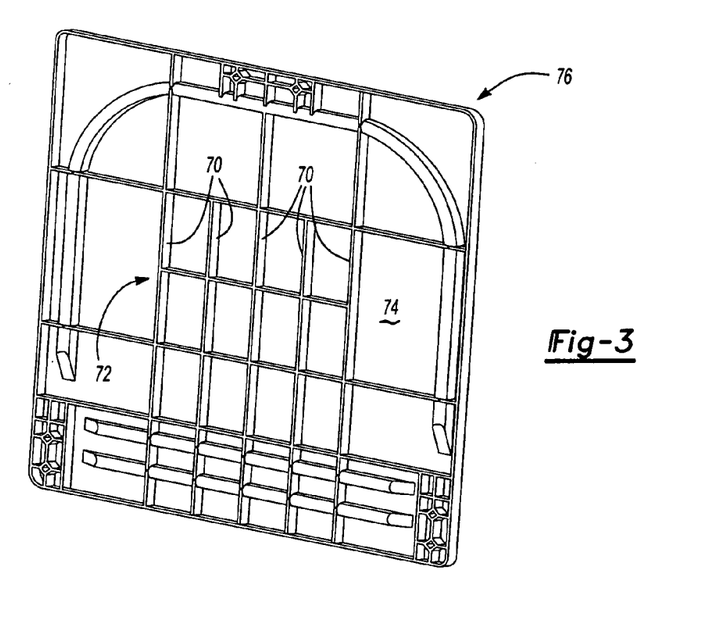
FIG. 3 is a perspective view of alternative seatbacks for a seating system.

As examples, FIGS. 2 and 3 illustrate exemplary alternatives to the seat back 20 of FIG. 1 with improved centralized reinforcement ribs. In particular, FIG. 2 shows that, amongst other configurations, channel forming ribs 60 may be in a W-shaped configuration on a wall 62 of a panel 64. FIG. 3, on the other hand, illustrates that ribs and particularly primary planar ribs 70 may be concentrated more heavily in one region 72 (e.g., a central region) as opposed to other regions upon the a wall 74 of a panel 76.

It is also contemplated that integrated reinforcement ribs or other structures may employed at locations such as the perimeter regions of a seat back and in the regions proximate hardware, such as seat belts, seat belt anchors, hinges, latching components or the like. It is even further contemplated that one or more integrated reinforcement structures may be formed in the vicinity of any latch strikers or latch members. In some applications, such as where the seat is intended to carry the load for a center belt, or a child seat tether, it may be desirable to modify, further reinforce or eliminate the top perimeter horizontally oriented integrated reinforcement structure to reduce the potential for hinge effect stress concentrator in that vicinity.

It should be recognized that the present invention advantageously also permits for insert molding of brackets or other hardware for securing the seat component to the vehicle.

In instances where a center passenger shoulder belt system is employed, or a top child seat tether is employed, optionally, design criteria is employed to help reduce the forward, downward and torsional or diagonal bending of the seat back that are caused by perimeter loads at or adjacent the shoulder belt or tether attachments. Preferably the integrated reinforcement structures will provide good vertical stiffness (as this is the plane that is anticipated to endure the more severe bending forces), as well as good torsional stiffness (responsive to the diagonal offset loads a passenger imparts to a shoulder belt system). In such instances, may be preferable to alternate geometries of the integrated reinforcement structures either in a random or predetermined pattern, or to maintain the integrated reinforcement structure width up to about 40 mm, and more preferably up to about 30 mm (e.g., about 5 to about 30 mm).

The employment of vertically oriented integrated reinforcement structures is particularly preferred in the load path for center belt loads and upper child seat tethers to help avoid vertical bending. Preferably, for these applications, the integrated reinforcement structure width (W) will vary up to about 50 mm and more preferably will be about 4 to about 40 mm, and still more preferably will be about 15 to about 25 mm. The vertically oriented integrated reinforcement structure length ($L_R$) will vary between about 70 to about 95% of the vertical seat back height, and more preferably about 80 to about 90%.

It will be appreciated that the above design criteria are preferred but are not intended as limiting. Depending upon the particular applications, variations to the above may be made. Moreover, it should be appreciated that forming an integrated reinforcement structure need not occur in every application, and the need for and magnitude of such generally will be directly proportional relationship to the size of the seat back. Thus, for example, a smaller folding seat may not require a perimeter integrated reinforcement structure or it may only require it in limited areas.

Though it is possible that locally reinforced structures integral with the seat back may be employed in one preferred embodiment, it is contemplated that one or more hinge assemblies are secured to the seat back after fabrication of the seat back. The hinge assemblies preferably include relatively tough and high strength to weight materials (such as plain carbon or alloy steels, or a comparable metal, composite or other material), and are configured for facilitating controlled deformation for transmitting loads. Examples of such hinge assemblies are disclosed in commonly owned patent application Ser. Nos. 09/766,792 (filed Jan. 22, 2001), Ser. No. 60/312,874(filed Aug. 15, 2001) and Ser. No. 60/329,187(filed Oct. 12, 2001), expressly incorporated herein by reference for all purposes.

In addition to the above, for the seat backs of the present invention and for other seat backs, attachment systems have also been developed. Referring to FIG. 1 and the magnified view in FIG. 4, the attachment locations 44, 46 are generally part of a fastener system 80 that includes brackets 82 (e.g., shown as an L-bracket) and fasteners (not shown) such as screws, bolts or otherwise. The attachment locations 44, 46 are preferably defined by sub-portions of the walls 26, 28 with areas that typically range from about 10 cm$^2$ to about 100 cm$^2$, more preferably from about 20 cm$^2$ to about 80 cm$^2$, still more preferably from about 30 cm$^2$ to about 70 cm$^2$.

Figure 4:
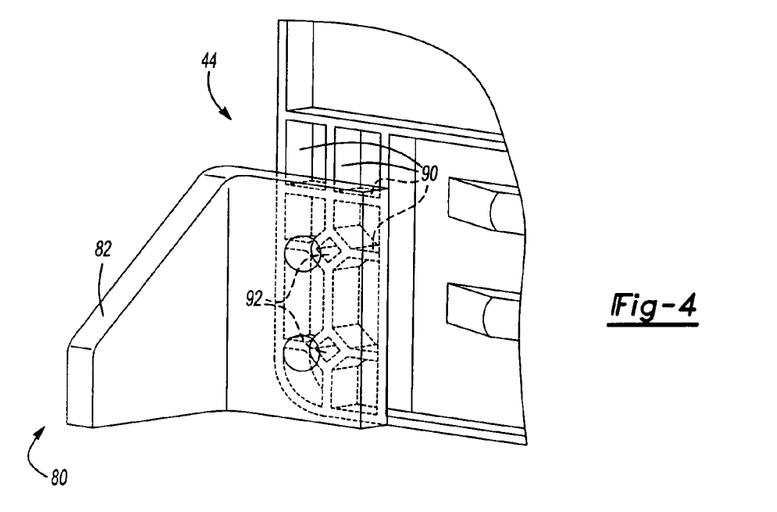
FIG. 4 is a perspective view of an attachment system for a seating system.

As shown, each of the attachment locations 44, 46 includes a plurality of spaced apart planar localized or secondary ribs 90 that extend partially or substantially entirely across the sub-portions of the main walls 26, 28 in a criss-cross pattern. Preferably, the ribs 90 combine to form cavities 92 suitable for threadably or otherwise receiving the fasteners such that the brackets 82 or portions of the body of the vehicle may be attached to the seat back 20.

Figure 5:
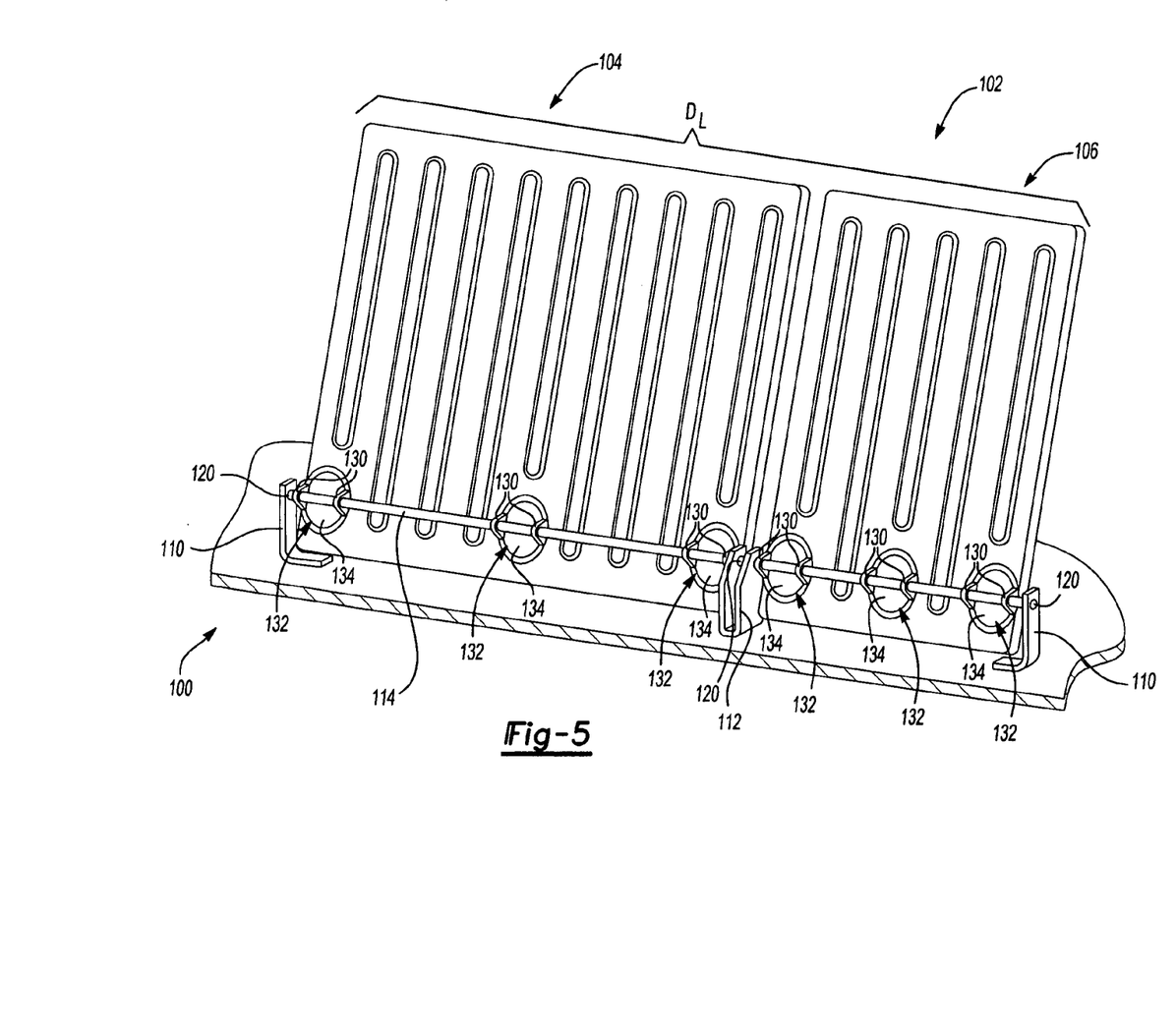
FIG. 5 is a perspective view of an alternative attachment for a seating system.

0f course, a variety of attachment sytems alternative to that shown in FIG. 4 may be employed in the present invention. According to one alternative preferred embodiment, the seat back is attached to the body (e.g., the body-in-white) of the vehicle with an improved attachment system 100, an exemplary configuration of which is shown in FIG. 5. The attachment system typically includes one or more brackets, one or more rods and one or more looped or otherwise shaped fasteners, which are preferably integrally formed with a seat back at one or more attachment locations. Preferably, the looped fasteners are attached to the seat and the brackets are attached to the body of the vehicle such that the one or more rods may interconnect the brackets to the looped fasteners for hingedly or rotatably attaching the seat back to the body of the vehicle.

Referring to FIG. 5, the exemplary attachment system 100 is applied to a seat back 102 having a first panel 104 and a second panel 106 rotatably connected to a plurality of brackets 110, 112 with one or more rods 114. In the embodiment shown, the first and second panels 102, 104 each include a pair of opposing panel portions, which may be injection molded, blow molded or otherwise formed. However, it is contemplated, and in certain instances, it may be preferred, that the attachment system 100 be employed in conjunction with a seat back such as the seat back 20 of FIG. 1 wherein only one main wall 26, 28 or panel portion extends substantially continuously between the periphery 30, 32 of the respective panels 22, 24.

Referring again to FIG. 5, the system 100 includes two outer L-shaped brackets 100 and one central U-shaped bracket 102. Of course, it shall be appreciated that the brackets of the system 100 may be formed in a variety of shapes, sizes, configurations or the like and the system 100 may include as many or as few brackets as needed or desired to anchor the seat back. Moreover, each of the brackets may be attached to the body of vehicle either directly or through another member or fastener. Preferably, each of the brackets 110, 112 is formed of metal (e.g., a low to medium carbon steel, such as 9050 or 1010 steel), however, alternative materials such as plastics, composite materials or the like may be employed. It is also preferable for each of the brackets 110, 112 to include one or more openings 120 (e.g., cavities or through-holes) for receiving the one or more rods. Of course, it is contemplated that the rods may be otherwise attached (e.g., welded) to the brackets such that openings within the brackets are unneeded. It is also contemplated that the brackets, threads or both, may be formed integrally as part of the body of the vehicle.

The one or more rods of the attachment system 100 may be a singular rod extending between the brackets or may be a pluralitys of rods extending between the brackets. In FIG. 5, the one or more rods is a singular rod 114 extending substantially across the entire lateral distance ($D_L$) of the seat back 102. Preferably, the rod 114 is non-rotatable relative to the brackets, although in certain instances, it may be desirable for the rod 114 to be rotatable.

For attachment of the seat back 102 to the one or more rods and or the brackets, it is preferred that the seat back 102 include one or more fasteners, which are illustrated as looped fasteners 130 that are integral with the panels 104, 106 of the seat back 102. In the particular embodiment depicted, a plurality of attachment locations 132 (e.g., three per panel 104, 106) are defined on each of the panels 104, 106 by protrusions 134 supporting the fasteners 130. In the embodiment shown, each of the protrusions 134 support a pair of fasteners 130. Preferably, the protrusions 134 and the fasteners 130 are integrally formed of plastic with the seat back 102 in a molding process (e.g., injection or blow molding). Moreover, it is preferable for the protrusions 134, the fasteners 130 or both to extend outwardly away from the panels 104, 106 a sufficient distance to allow relatively free rotation of the panels 104, 106 relative to the brackets, the rods or the likes.

The seat back 102 may be attached to the one or more rod of the attachment system in a variety of way. In a preferred embodiment, the rod 114 is extended through openings 140 (e.g., through-holes) in fasteners 130 such that the fasteners 130 may rotate about the rod 114. In a highly preferred embodiment, the openings 140 of the fasteners 130 may be fitted with bearings (not shown), a self lubricating surface, or the like to assist the rotation of the fasteners 130 about the rod 114.

The skilled artisan will recognize that although the seating system of the present invention has been described in relation to automotive seating, the system may also be used for other seats such as airplane and bus seats or auditorium and stadium seats.

In addition to the attachment systems already discussed, the seating system of the present invention may incorporate one or more retention mechanisms (e.g., latch assemblies) at any of a number of different locations on the seat assembly (e.g., along the seat sides, on the seat back, or along the top of the seat back), for affording releasable self locking of the seat back to the vehicle relative to its hinge. It is preferred that any such retention mechanism provide a sufficient combination of high strength and good load distribution over the structure to which it is attached and high strength. Preferably, the configuration is such that the seat is maintained in place by the retention mechanism in the event of a sudden or rapid acceleration, deceleration or other force, so that load on the seat back can be transferred as desired within the seat back. Exemplary retention mechanisms are disclosed in commonly owned U.S. patent applicantion Ser. No. 60/329,187(filed Oct. 12, 2001) herein expressly incorporated by reference for all purposes.

It should be recognized that, though illustrated with reference to the preferred seat back disclosed herein, the hinges, retention mechanism and other features disclosed herein may likewise be employed in a blow molded or injection molded structure with opposing wall seat back structure as is taught (for example) in co-pending U.S. application Ser. No. 09/766,792 (filed Jan. 22, 2001) and Ser. No. 60/329,187(filed Oct. 12, 2001), incorporated by reference.

It may be desirable to further reduce the potential for the retention mechanism to create a hinge point, by locally reinforcing the seat back in or adjacent the region to which the latch member is secured. This can be done in any suitable manner, for instance, by the incorporation of one or more integrated reinforcement structures in that region or by incorporation of an additional or supplemental metal, plastic or composite reinforcement member within the seat back, about the entirety or at least a portion of the perimeter of the seat back. Accordingly, in the present invention, it is contemplated that the attachment locations 46 at the top of the seat back 20 in FIG. 1 may be adapted to releasably fasten with a retention mechanism.

As will be appreciated, proper material selection will permit efficient design and molding of optimal wall thicknesses, part section thicknesses or both, for achieving the desired performance without substantially increasing vehicle weight or intruding into interior space availability. By way of example, it is desired for many applications that the maximum wall stock thickness will range up to about 6 mm or higher, more preferably it will range from about 1 mm to about 4.0 mm, and still more preferably, it will range from about 2 mm to about 3 mm. Likewise, the maximum section thickness will range up to about 100 mm, more preferably it will range from about 10 mm to about 60 mm, and still more preferably it will range from about 20 to about 35 mm.

The materials selected for forming the walls, reinforcement structures or both of the seat backs of the present invention preferably exhibit an elastic modulus ranging from about 500 MPa to about 6000 MPa, and more preferably about 1300 to about 3500 MPa, and still more preferably about 1700 to about 2500 MPa. In applications when the seat back is also to be used as a load bearing floor, it is preferable to select a material toward the higher end of the ranges.

The preferred flexural modulus will be at least about 600 MPa, more preferably it will range from about 200 to about 500 ksi (1300 to about 3500 MPa), and still more preferably about 250 to about 350 ksi (1700 to about 2500 MPa).

The preferred yield strength of the material ranges from about 20 to about 200 Mpa. More preferably it will range from about 25 to about 70 MPa and still more preferably about 35 to about 55 Mpa. Moreover, the ductility (as measured by percent elongation) of the material preferably ranges from about 20% to about 150%, and more preferably it is at least about 30% and still more preferably, it is at least about 100%.

The material also will preferably exhibit attractive processing characteristics, such as a melt flow rate (230° C./3.8 kg-I; according to ASTM D1238) of about 0.300 to about 5.0 g/10 min to about 0.900 to about 3 g/10 min; a softening point (according to ASTM D1525) of less than about 180° C., and more preferably about 90° C. to about 150° C.; linear-flow mold shrink (according to ASTM D 955) of about 0.076 mm/mm (0.003 in/in) about 0.203 mm/mm (0.008 in/in) and more preferably about 0.152 mm/mm (0.006 in/in) to about 0.178 mm/mm (0.007 in/in); or a combination of these properties.

Accordingly, in one preferred embodiment, the seat back of the present invention preferably is made from a plastic material, and more preferably a thermoplastic material. In a particularly preferred embodiment, the seat back is made from a high strength thermoplastic resin selected from styrenics, polyamides, polyolefins, polycarbonates, polyesters or mixtures thereof. Still more preferably they are selected from the group consisting of acrylonitrile butadiene styrene, polycarbonate/acrylonitrile/butadiene styrene, polycarbonate, polyphenylene oxide/polystyrene, polybutylene terephthalate, polyphenylene oxide, polyphenylene ether, syndiotactic polystyrene, ethylene alpha olefin, polybutylene terephthalate/polycarbonate, polyamide (e.g., nylon), polyesters, polypropylene, polyethylene, and mixtures thereof.

Examples of preferred commercially available materials include PULSE® 2200 BG or 20 EZ and MAGNUM® 1150 EM, both available from The Dow Chemical Company.

In certain preferred embodiments, the polymeric materials may include fibers for additional strength. Although it is contemplated that fibers of various sizes (e.g., lengths) may be employed, advantageously, it has been found that relatively long glass fibers add a relatively high degree of strength. Thus, in preferred embodiments, a polmeric material such as polypropylene is filled with glass fibers having an average length of approximately greater than 2 mm, more preferably greater than about 4 mm even more preferably greater than about 6 mm and most preferably between about 8 mm and 20 mm.

In another embodiment it is contemplated that a laminate or blend of at least two different plastic materials is provided for forming the panels. This may be accomplished in any of a number of different ways. For example, in one embodiment, a coextrusion of two or more different materials is provided and then it is subject to a further processing step, such as thermoforming.

In another embodiment, suitable for forming any of the components or assemblies of the present invention, a parison is provided for blow molding. The parison includes a first material at least partially encapsulated in a second material. Upon blow molding, adjoining layers of each of the materials are formed. Such a parison may be formed using any suitable art disclosed technique. One possible approach to such technique is illustrated in U.S. Pat. No. 5,968,431 (Issued Oct. 19, 1999; Ang et al.) incorporated herein by reference.

While the technology of the present invention has been illustrated in connection with certain fabrication processes, it is not intended to be limited to such processes. Like results may be attainable using the teachings of the present invention in combination with other fabrication techniques, including but not limited to injection molding, lost core processing, rotoforming, compression molding (with or without decorative or structural inserts), thermoforming, blow molding or the like.

As will be appreciated from the above, preferred seating systems that are optimized in accordance with the criteria outlined herein, and using the referenced materials, consistently should pass United States and European government test standards for motor vehicles (e.g., as addressed in FMVSS 207, FMVSS 210, FMVSS 225 (49 CFR 571.207, 0.210, 0.225) or ECE 17; all such standards being expressly incorporated by reference herein) as well as the requirements of automobile original equipment manufacturers and their suppliers.

In one embodiment, the seating system (1) is capable of withstanding without rupture at least about 11000 Newtons in the direction in which the seat faces in a plane, parallel to the longitudinal centerline of the vehicle; (2) exhibits, upon rapid acceleration up to at least about 20 g, substantially no fragmentation of the seat back with at least a 30 kg mass placed behind the seat back; or (3) both (1) and (2).

More preferably, the seating system (1) is capable of withstanding without rupture at least about 13000 Newtons in the direction in which the seat faces in a plane, parallel to the longitudinal centerline of the vehicle; (2) exhibits, upon rapid acceleration of about 20 to about 30 g, substantially no fragmentation of the seat back with at least a 36 kg mass placed behind the seat back; or (3) both (1) and (2).

Though not intended to be limited thereby, in one embodiment, the seats, the anchorages, attachment hardware, and attachment bolts for the systems of the present invention are capable of withstanding without complete rupture at least a 3000 pound force and more preferably a 5,000 pound force. In one particularly preferred embodiment, the system is capable of withstanding a force of at least about 13,000 N to about 22,000 N generally in the direction in which the seat faces (to a pelvic body block)in a plane parallel to the longitudinal centerline of the vehicle, with an initial force application angle of not less than about 5 degrees or more than about 15 degrees above the horizontal. Still more preferably, the system withstands such force even when applied at an onset rate of not more than about 133,000 N per second to about 222,000 N per second, whereby the force is attained in not more than about 30 seconds and is maintained for about 10 seconds.

In yet another embodiment, each seat assembly is capable of withstanding (a) in any position to which the seat can be adjusted, a force (Newtons) of 20 times the mass of the seat in kilograms multiplied by 9.8 applied in a forward or rearward longitudinal direction; or in its rearmost position, a force that produces a 373 Newton meters moment about the seating reference point for each designated seating position that the seat provides (as applied to an upper cross-member of the seat back or the upper seat back, in a rearward longitudinal direction for forward-facing seats).

In yet another highly preferred embodiment, the seatback of the present invention is incorporated into a seat assembly, and two 18 kg masses (e.g., cubes with an edge length of about 300 mm) are placed about 200 mm from the seat back. Upon rapid acceleration to at least about 20 to about 30 g, the seatback maintains the cargo disposed behind the seat back, with no visible fragmenting of the seat back or formation of sharp edges or corners.

Advantageously, in one additional preferred embodiment, the seat backs made in accordance with the present invention are capable of exhibiting a set less than 6 mm after soaking for about 4 hours at about 82° C. with an applied load of about 244 kg/m² and a momentary load of about 615 kg/m².

The stiffness, impact strength, and crack resistance of this seat back also will be greater than conventionally fabricated current blow molded polyethylene, filled polyethylene, polypropylene, or filled polypropylene seat backs.

The present invention contemplates techniques and methods for the optimization of one or more of material selection, wall thickness, section thickness, hinge design, and latch design, for realizing the desired stiffness and strength to meet traditionally demanding load requirements in automotive vehicles occasioned of center mounted shoulder belt loads, child seat anchor loads, or cargo intrusion. The skilled artisan will recognize, however, that from application to application, design requirements will vary, and therefore a reasonable amount of experimentation may be needed to adapt the various teachings to the unique intended environment. By way of example, part size, seat belt location, hinge points, latch locations, and split ratio may affect final design. It is believed that the use of conventional computer aided engineering (CAE) techniques in combination with the present teachings will yield satisfactory results, which can be improved as desired with conventional techniques for localized steel reinforcement (e.g., in high stress areas, such as hinge points, latch areas, seat belt mounting areas, and armrest support areas).

Thus, the present invention finds useful application in connection with any of a number of different types of seating systems, including but not limited to, adjustable seats, fixed position seats, foldable seats, seats pivotal about an axis, including but not limited to hinged seats. The seats may be vehicle rear seats, vehicle front seats, third row seats, jump seats or the like. As already indicated, in another particularly preferred embodiment, vehicle front seat backs are assembled in accordance with the above teachings. Moveable seats may be held in place by latches disposed in the central portion of the seating configuration (e.g., at the top), along the seat sides (anywhere from the top to the bottom), or elsewhere. Fixed seats may include no latch assembly nor any assembly. The seating system may include one or more rear seats that fold downward to a larger storage area, and which may require the seat back to act as load floor. The seat may be a split design (e.g., about 50/50, 60/40, 70/30 or the like), or the seats may constitute a one piece design. In one embodiment, the seat back is latched to either a structural package shelf (top latches) or to the body in white (side outboard latches), and seat belt anchors or seat belt guidance system (as may be needed for a center mounted belt) for the two outboard seats is not attached on the seat.

A sliding lock pin might be incorporated between two folding seats. The sliding pin can be unlocked to fold down one portion of the seat and self locking when the seat backs are both upright. Localized reinforcement (e.g., steel reinforcement or plastic foam) for a spreading loads may be incorporated into potential stress concentration locations, such as hinge points, latch areas, seat belt anchorage locations, child seat tether anchor locations, head rest attachments, armrest support areas, or the like.

In another embodiment, seat belt anchors or a seat belt guidance system for the center seat belt and/or child tether anchors are attached to the seat. Preferably, the top center seat belt mounting location is towards the middle of the seat back to help minimize the extent of cantilever, thereby helping to minimizing bending in response to a force.

Though it finds application in a variety of other environments (e.g., rail transportation seating, air transportation seating, amusement park rides, auditorium or stadium applications, or elsewhere), the present invention is particularly suitable for application in automotive vehicles of a number of different types, including but not limited to passenger cars (including sedans, coupes, station wagons, convertibles, or the like), multipurpose passenger vehicles (including sport utility vehicles, sport activity vehicles, minivans, or the like), trucks, and buses.

Systems of the present invention are not limited to seat backs, but may also include one or more additional components for a vehicle interior system, particularly a seating system, such as seat belts, and seat belt anchorage components for transferring seat belt loads to the vehicle structure, including, but not limited to, the attachment hardware, seat frames, seat pedestals, the vehicle structure itself, and other parts of the vehicle that help to prevent of the belt from the vehicle structure. The systems may optionally include supplemental inflatable restraint systems, such as air bags. Other seating system components that are contemplated as within the systems of the present invention include, without limitation, seat adjusters (power actuated and manual), lumbar supports, child seats, child seat tether anchors, wheels, integrated handles, telescoping, retractable or adjustable length handles, synthetic upholstery, natural upholstery (such as leather), seat warmers, seat coolers, headrests, integrated stereo components, arm rests, leg rests, cup holders, or the like. While in a preferred embodiment the seat belt incorporated into the system is a shoulder belt, and more preferably a three point harness, other seat belt types may also be used, such as lap belts only, lap belts with a separate or detachable torso belt.

As will be appreciated, the present invention also affords considerable design and manufacture flexibility, including but not limited to the ability to vary the configurations and contours of the respective walls of a seat back. For instance, a wall could be moldably configured to provide a suitable lumbar support. A wall could be configured to provide a relatively flat surface for carrying loads. Optionally, the wall or panel could be configured with suitable component housings or cargo carrying implements such as troughs, tie down members, tonneau cover brackets, seat belt retractor housings, or the like.

It will be appreciated that the present invention need not be limited to seat backs. The teachings may be extended also to the seat base portions of seating assemblies. In this regard, it may also be possible for the seat base and the seat back to be assembled onto a common frame. The frame may be assembled to the the seat back before or after assembly to the seat base. The frame may include or carry any of a number of different features that are typically incorporated into seat assemblies, including motors, heaters, supports, cushions, or the like.

For this embodiment, as well as the other embodiments disclosed herein, advantageously a show surface (e.g., a surface exposed to view in or on the vehicle) may be fabricated from a molded-in-color thermoplastic polyolefin (e.g., a molded in color thermoplastic polyolefin outer surface) joined to an underlying component for imparting strength and rigidity to the resulting assembly. For example, a molded-in-color thermoplastic polyolefin outer panel might be joined to a polycabonate acrylonitrile butadiene styrene support structure.

The technology of the present invention may also be applied in providing partial or entire vehicle interior systems, including but not limited to headliners, vehicle doors, glove compartments, knee bolsters, and the like. In this regard, it may be possible to attach two or more components to each other (whether the same material or not) using one of the presently described adhesives.

In another embodiment, the seating system of the present invention, the seating system of commonly-owned and co-pending U.S. application Ser. No. 09/766,792 (filed Jan. 22, 2001; incorporated by reference herein), or both are upholstered with:

a suitable fabric cover, leather or suede cover, simulated leather or suede cover, or a combination thereof;
a. a carpet or other floor covering; or
b. a combination thereof.

In one embodiment, a hook and loop fastening system is applied to the seat back for attaching the upholstery. In another embodiment, upholstery is attached and then a cushion material (e.g., a foam) is inserted between the upholstery and the seat back. Alternatively, the cushion material may be foamed in place. Art-disclosed rim trimming techniques, envelope trimming techniques or a combination thereof may also be employed. Of course, as discussed in the above, art-disclosed insert molding techniques may be applied as well.

Another advantage of the present invention is that it lends itself well to the ability to provide seat assemblies that can be recycled. Accordingly, in another aspect of the present invention, after the product life has concluded the products of the present invention are recycled using art-disclosed recycling techniques. In this regard, in one preferred embodiment, the plastics that are employed to fabricate a component are from the same plastic family for recycling purposes. Of course, in another embodiment, they may be from different families.

In another embodiment, it is possible to vary the materials used for the seat backs across the width of the seating assembly in a vehicle. For example, for a split seat arrangement (e.g. 60/40) one seat back may be one material, and the other a different material. For example, one seat back is made of PC/ABS and the other one is HDPE.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims. In particular regard to the various functions performed by the above described components, assemblies, devices, compositions, etc., the terms used to describe such items are intended to correspond, unless otherwise indicated, to any item that performs the specified function of the described item, even though not necessarily structurally equivalent to the disclosed structure. In addition, while a particular feature of the invention may have been described above with respect to only one of the embodiments, such feature may be combined with one or more other features of other illustrated embodiments.

What is claimed is:

1. An automotive seatback system, comprising:
   a first panel having a main wall;
   a plurality of primary planar ribs positioned upon the first panel;
   a plurality of attachment locations for attaching the first panel to an automotive vehicle; and
   a plurality of channel forming ribs extending along the main wall of the first panel, which provide vertical and torsional stiffness to the main wall wherein:
   i. the channel forming ribs form tubular structures in conjunction with the main wall;
   ii. the first panel, primary ribs and the channel forming ribs are one integrally molded plastic piece;
   iii. one or more of the channel forming ribs along with one or more of the tubular structures extend horizontally substantially entirely from a first side of the first panel to a second side of the first panel, the first side opposite the second sides; and
   iv. one or more of the channel forming ribs extend substantially continuously from a lower location to an upper location of the first panel;
   wherein the seatback is capable of withstanding without rupture at least about 11,000 Newtons.

2. An automotive seatback system as in claim 1 wherein the plastic piece is made up of a material that includes a plastic selected from the group of styrene, polyamide, polyolefin, polycarbonate, polyester, acrylonitrile butadiene styrene, polycarbonate/acrylonitrile/butadiene styrene, polycarbonate, polyphenylene oxide/polystyrene, polybutylene terephthalate, polyphenylene oxide, polyphenylene ether, syndiotactic polystyrene, ethylene alpha olefin, polybutylene terephthalate/polycarbonate, polypropylene, polyethylene and mixtures thereof.

3. An automotive seatback system as in claim 1 wherein each of the channel forming ribs is formed by gas assist injection molding.

4. An automotive seatback system as in claim 1 wherein the plurality of attachment locations are defined upon the first panel, each of the attachment locations including a plurality of secondary planar ribs.

5. An automotive seatback system as in claim 4 wherein one or more of the plurality of channel forming ribs extend between at least two of the plurality of attachment locations.

6. An automotive seatback system as in claim 1 wherein:
   i) each of the plurality of attachment locations includes at least one looped fastener;
   ii) a rod extends through the at least one looped fastener of each of the plurality of attachment locations; and
   iii) a pair of brackets for attaching to the vehicle and the rod.

7. An automotive seatback system as in claim 6 wherein one or more of the plurality of channel forming ribs extend between at least two of the plurality of attachment locations.

8. An automotive seatback system as in claim 1 wherein at least one of the primary planar ribs extends about the periphery of the first panel.

9. An automotive seatback system as in claim 1 wherein at least two of the primary planar ribs extend across the main wall in a criss-cross pattern.

10. An automotive seatback system as in claim 1 wherein the plurality of channel forming ribs are arc-shaped in cross-section.

11. An automotive seatback system as in claim 1 wherein the channel forming ribs have a width of about 4 mm to about 40 mm.

12. An automotive seatback system, comprising:
   a first panel having a main wall;
   a plurality of primary planar ribs positioned upon the first panel wherein:
   i) at least one of the primary planar ribs extends about the periphery of the first panel;
   ii) at least two of the primary planar ribs extend across the main wall in a criss-cross pattern; and iii) the primary planar ribs are integrally formed with the main wall of the same material;
a plurality of attachment locations defined upon the first panel, each of the attachment locations including a plurality of secondary planar ribs;
a plurality of channel forming ribs extending along the main wall of the first panel, which provide vertical and torsional stiffness to the main wall, at least one of the plurality of channel forming ribs extending horizontally at least partially between and substantially interconnecting two of the plurality of attachment locations wherein the first panel is at least part of a seatback within an automotive vehicle wherein:
  i) the channel forming ribs form tubular structures in conjunction with the main wall;
  ii) the first panel, the primary ribs, the attachment locations and the channel forming ribs are one integrally molded plastic piece;
  iii) one or more of the channel forming ribs along with one or more of the tubular structures extend horizontally substantially entirely from a first side of the first panel to a second side of the first panel, the first side opposite the second side; and
  iv) one or more of the channel forming ribs extend substantially continuously from a lower to an upper location of the first panel;
wherein the first panel adapted for attachment to the vehicle at the plurality of attachments locations.

13. An automotive seatback system as in claim 12 wherein the plastic piece is made up of a material that includes a plastic selected from the group of styrene, polyamide, polyolefin, polycarbonate, polyester, acrylonitrile butadiene styrene, polycarbonate/acrylonitrile/butadiene styrene, polycarbonate, polyphenylene oxide/polystyrene, polybutylene terephthalate, polyphenylene oxide, polyphenylene ether, syndiotactic polystyrene, ethylene alpha olefin, polybutylene terephthalate/polycarbonate, polypropylene, polyethylene and mixtures thereof.

14. An automotive seatback system as in claim 12 wherein each of the channel forming ribs is formed by gas assist injection molding.

15. An automotive seatback system as in claim 12 wherein the plurality of channel forming ribs are arc-shaped in cross-section.

16. An automotive seatback system as in claim 12 wherein the channel forming ribs form tubular structures in conjunction with the main wall.

17. An automotive seatback system as in claim 12 wherein the channel forming ribs have a width of about 4 mm to about 40 mm.

18. An automotive seatback system, comprising:
a first panel having a main wall;
a plurality of primary planar ribs positioned upon the first panel wherein:
  i) at least one of the primary planar ribs extends about the periphery of the first panel;
  ii) at least two of the primary planar ribs extend across the main wall in a criss-cross pattern; and
  iii) the primary planar ribs are integrally formed with the main wall of the same material;
a plurality of attachment locations defined upon the first panel, each of the attachment locations including a plurality of secondary planar ribs;
a plurality of channel forming ribs extending along the main wall of the first panel, at least one of the plurality of channel forming ribs extending at least partially between two of the plurality of attachment locations wherein the channel forming ribs form tubular structures in conjunction with the main wall;
a second panel having a main wall, the second panel laterally adjacent to the first panel for spanning a lateral distance of the seat back system; and
a plurality of channel forming ribs extending along the main wall of the second panel.

19. An automotive seatback system as in claim 18 wherein the second panel and the plurality of channel forming ribs of the second panel are integrally molded together of a plastic material.

20. An automotive seatback system as in claim 19 wherein the plastic material includes a plastic selected from the group of styrene, polyamide, polyolefin, polycarbonate, polyester, acrylonitrile butadiene styrene, polycarbonate/acrylonitrile/butadiene styrene, polycarbonate, polyphenylene oxide/polystyrene, polybutylene terephthalate, polyphenylene oxide, polyphenylene ether, syndiotactic polystyrene, ethylene alpha olefin, polybutylene terephthalate/polycarbonate, polypropylene, polyethylene and mixtures thereof.

21. An automotive seatback system as in claim 20 wherein each of the channel forming ribs is formed by gas assist injection molding.

22. An automotive seatback system as in claim 21 wherein each of the channel forming ribs is arc-shaped in cross-section, the cross-section taken perpendicular to a length of the channel forming ribs.

23. An automotive seatback system as in claim 22 wherein:
  i) the channel forming ribs of the first panel provide vertical stiffness and torsional stiffness to the main wall;
  ii) one or more of the channel forming ribs of the first panel extend horizontally substantially entirely from a first side of the first panel to a second side of the first panel, the first side opposite the second side; and
  iii) the one or more of the channel forming ribs extend substantially continuously from a lower to an upper location of the first panel.

24. An automotive seatback system as in claim 18 wherein the first panel is at least part of a seatback within an automotive vehicle.

25. An automotive seatback system, comprising:
a first panel having a main wall;
a plurality of primary planar ribs positioned upon the first panel;
a plurality of channel forming ribs forming a plurality of tubular structures extending along the main wall of the first panel; and
an attachment system for rotatably attaching the first panel to an automotive vehicle, the attachment system including:
  i) a plurality of attachment locations, each of the attachment location including at least one looped fastener;
  ii) a rod extending at least partially through the at least one looped fastener of each of the plurality of attachment locations; and
  iii) a pair of brackets for attaching to the vehicle and the rod;
wherein the attachment location, the primary ribs, the first panel and the channel forming ribs are one integrally molded plastic piece.

* * * * *